United States Patent
Kuntzelman et al.

(10) Patent No.: US 10,011,082 B1
(45) Date of Patent: Jul. 3, 2018

(54) PNEUMATIC TIRE REPAIR AND INFLATION DEVICE

(71) Applicant: Plews, Inc., Dixon, IL (US)

(72) Inventors: Toby Kuntzelman, Pecatonica, IL (US); Joel R. Hemme, Aurora, IL (US)

(73) Assignee: Plews, Inc., Dixon, IL (US)

( * ) Notice: Subject to any disclaimer, the term of this patent is extended or adjusted under 35 U.S.C. 154(b) by 0 days.

(21) Appl. No.: 15/476,190

(22) Filed: Mar. 31, 2017

(51) Int. Cl.
| | | |
|---|---|---|
| *B65B 31/00* | (2006.01) | |
| *B29C 73/02* | (2006.01) | |
| *B60S 5/04* | (2006.01) | |

(52) U.S. Cl.
CPC .............. *B29C 73/025* (2013.01); *B60S 5/04* (2013.01)

(58) Field of Classification Search
CPC ................................ B29C 73/025; B60S 5/04
See application file for complete search history.

(56) References Cited

U.S. PATENT DOCUMENTS

| | | | |
|---|---|---|---|
| 4,765,367 A | * | 8/1988 | Scott ..................... B29C 73/166 137/597 |
| 7,789,110 B2 | | 9/2010 | Marini |
| 9,073,269 B2 | | 7/2015 | Zalzalah |

\* cited by examiner

*Primary Examiner* — Jason K Niesz
(74) *Attorney, Agent, or Firm* — Bay Area Technology Law Group PC

(57) ABSTRACT

A tire repair and inflation device having a housing, a cavity for receiving and removably retaining a disposable self-contained aerosol container as a source of sealant, a disposable self-contained aerosol container containing sealant under pressure and a release valve. The device also includes a compressor and a multi-way valve, the multi-way valve having a first inlet for receiving sealant from the disposable self-contained aerosol container upon actuation of the release valve and a second inlet for receiving air under pressure from the compressor and an outlet for selectively discharging sealant and compressed air to a tire under repair, wherein the sealant being delivered to the multi-way valve and the compressed air being delivered to the multi-way valve act independently of one another.

4 Claims, 3 Drawing Sheets

PNEUMATIC TIRE REPAIR AND INFLATION DEVICE

TECHNICAL FIELD

The present invention relates to a tire repair and inflation device which includes a sealant delivery capability acting independently of the device's ability to inflate a tire under pressure.

BACKGROUND OF THE INVENTION

As automobiles become lighter, smaller and more fuel-efficient, it has become commonplace for manufacturers to eliminate spare tires as they tend to be heavy and oftentimes difficult to store. Many motorists are unaccustomed to changing a flat tire and will often times rely upon a towing service when confronted with a tire puncture. However, many times towing services are unavailable or a motorist cannot afford to wait until they can be scheduled. Some manufactures sell vehicles with run-flat tires but they tend to be expensive. As a consequence, it has become more and more frequent to provide kits capable of performing temporary repairs through the introduction of sealant and compressed air to enable the vehicle operator to at least drive to a repair facility.

Virtually all two-part systems for repairing tires employ compressors which perform the dual function of providing compressed air through a tire valve stem as well as to the interior of a sealant container. Systems of this nature are fabricated from rather elaborate machined parts which include a sealant container intake for receiving compressed air and output for introducing sealant to a multi-way valve driven by pressurized air emanating from the compressor. This results in reliability issues as the finely machined parts tend to clog and are otherwise costly to produce. As the machined parts clog due to hardening of the sealant, the general reliability of such devices is compromised particularly if the motorist does not need them for an extended period of time. Furthermore, such devices are incapable of using off-the-shelf self-contained aerosol sealant as they generally require dedicated sealant containers having the ability to receive pressurized air from an external compressor. If such a device could use off-the-shelf self-contained aerosol sealants, the sealant source could be periodically replaced to ensure ready availability of sealant when needed. Also, the use of a self-contained aerosol sealant would enable a motorist to introduce sealant to a tire under repair even if no electric power was available to operate the device's compressor.

It is thus an object of the present invention to provide a tire repair and inflation device which overcomes the limitations inherent in prior devices of this kind.

It is yet a further object of the present invention to provide a tire repair and inflation device which includes a disposable, self-contained aerosol sealant source which operates independently of the device's air compressor.

It is still a further object of the present invention to provide a tire repair and inflation device containing a disposable, self-contained aerosol sealant source which can be readily refreshed thus maintaining the viability of the device during long periods of nonuse.

SUMMARY OF THE INVENTION

A tire repair and inflation device comprising a housing, a cavity for receiving and removably retaining a disposable self-contained aerosol container as a source of sealant, a disposable self-contained aerosol container containing sealant under pressure and a release valve, a compressor and a multi-way valve, said multi-way valve comprising a first inlet for receiving sealant from said disposable self-contained aerosol container upon actuation of said release valve and a second inlet for receiving air under pressure from said compressor and an outlet for selectively discharging sealant and compressed air to a tire under pressure, wherein said sealant being delivered to said multi-way valve and said compressed air being delivered to said multi-way valve act independently of one another.

DETAILED DESCRIPTION OF THE INVENTION

Figure 1:
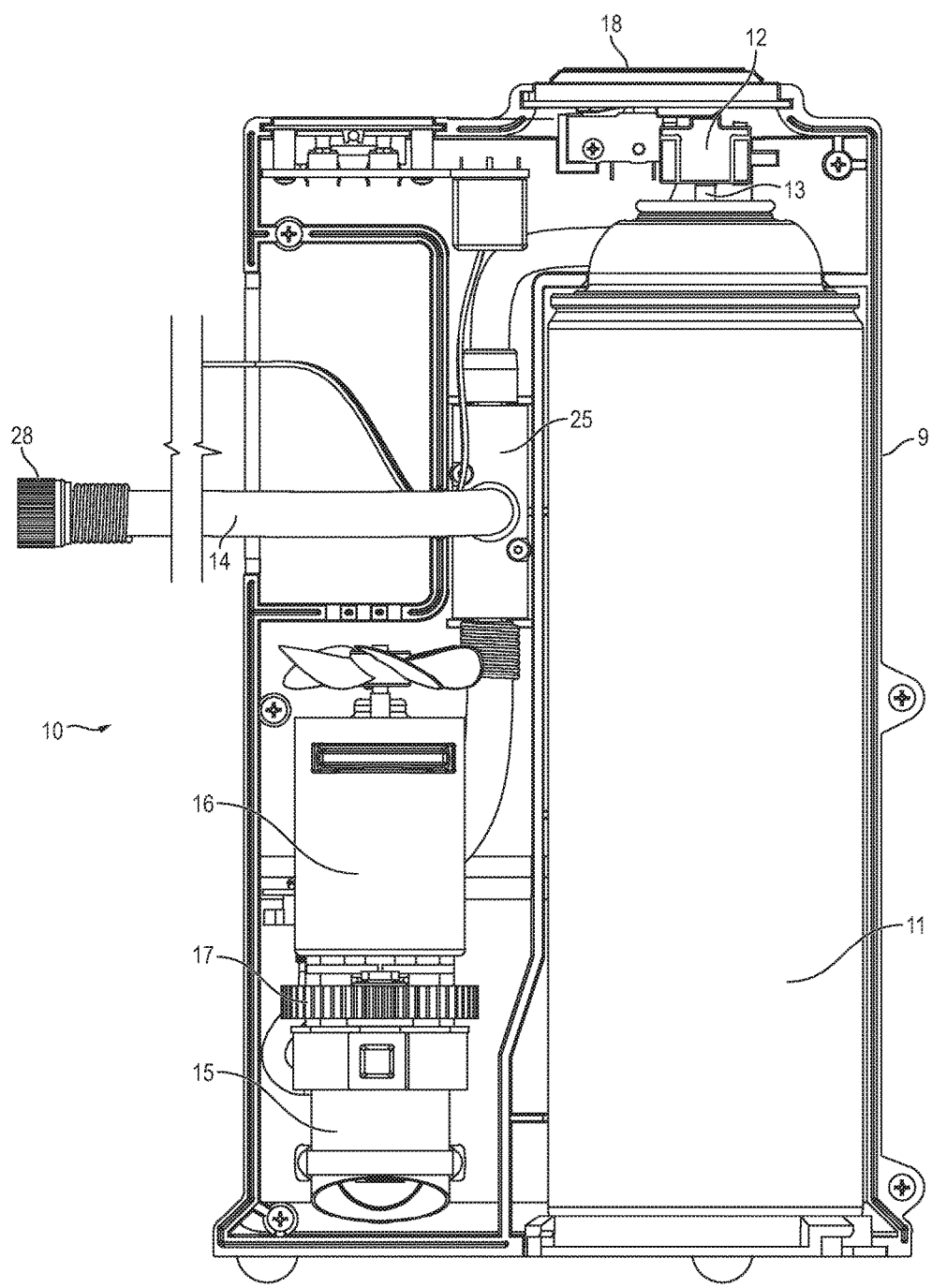
FIG. 1 is a cutaway side view of the tire repair and inflation device of the present invention.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

Figure 2:
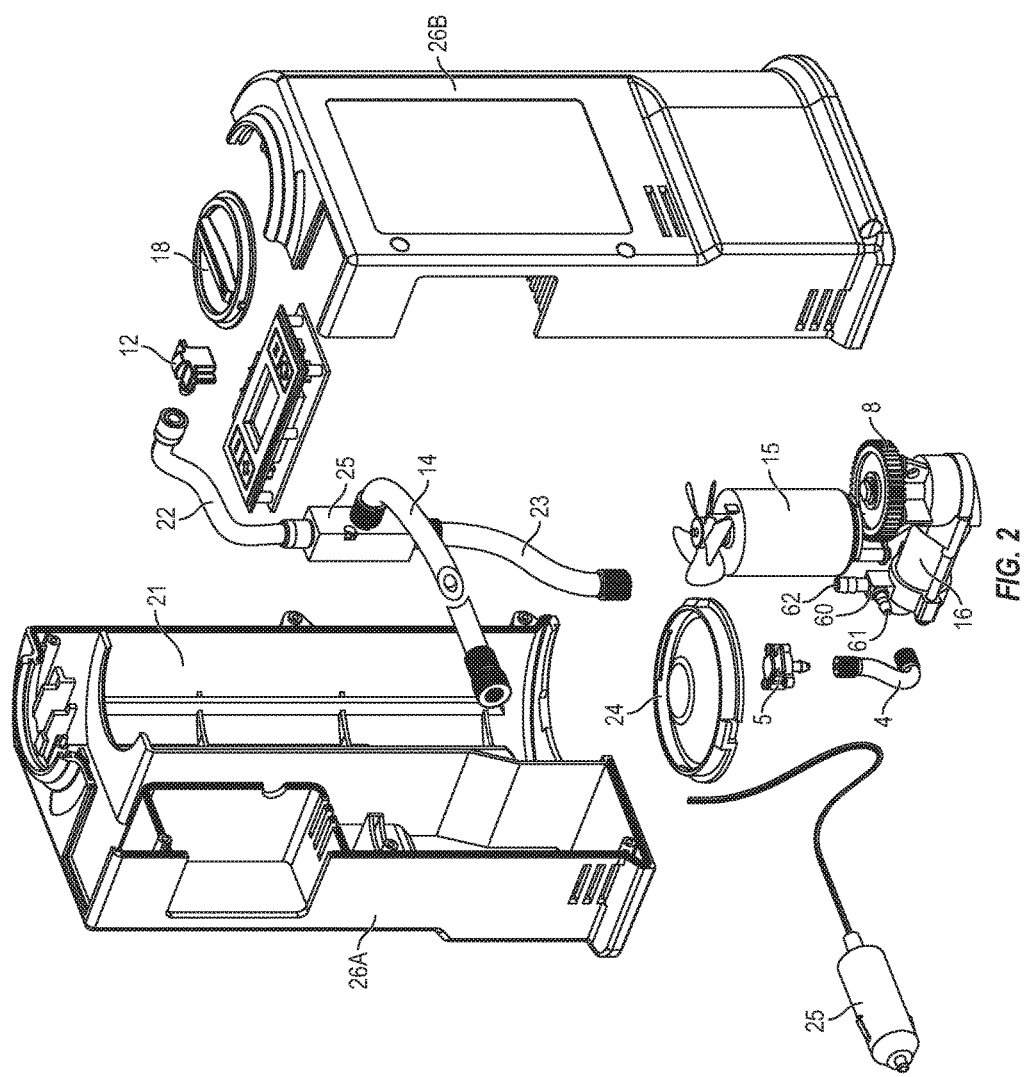
FIG. 2 is an exploded view of the tire repair and inflation device of FIG. 1 exposing its salient features.

Turning first to FIGS. 1 and 2, tire repair and inflation device 10 is depicted. Frame halves 26A and 26B are joined creating housing 9. As noted, the frame halves, when joined, create cavity 21 for receiving and removably retaining disposable self-contained aerosol container 11 which can be introduced and removed from cavity 21 by removing bottom cap 24.

Multi-way (three position) switch 18 is situated atop housing 9 for actuating release valve 12 which, in turn, depresses valve stem 13 for the release of sealant contained within disposable self-contained aerosol container 11, the details of multi-way switch 18 will be more readily apparent in the discussion which follows.

Figure 3:
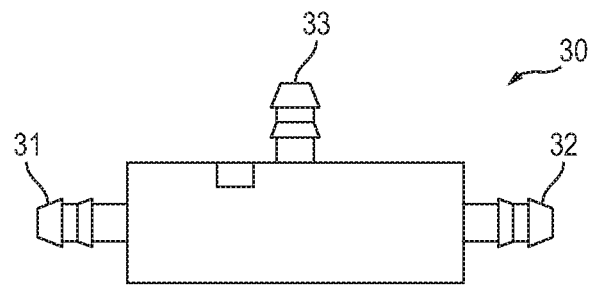
FIG. 3 is a plan view of a multi-way valve used in the present invention.
Figure 4:
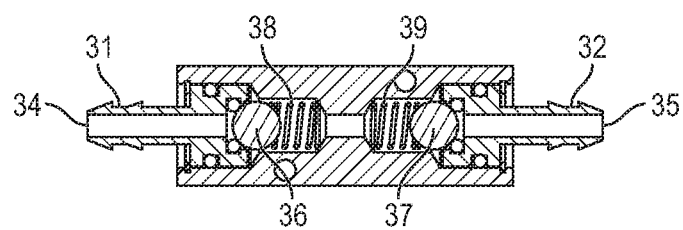
FIG. 4 is a cross-sectional view of the multi-way valve of FIG. 3.
Figure 5:
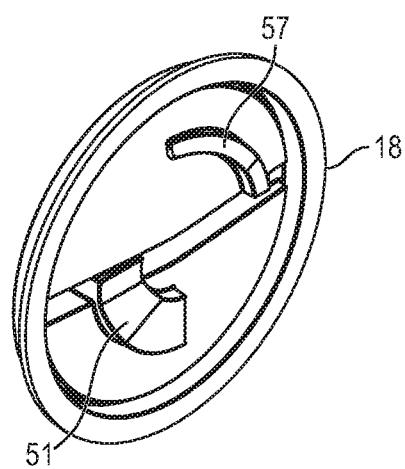
FIG. 5 is a perspective view of the multi-way switch used to selectively discharge sealant and compressed air during normal operation of the present tire repair and inflation device.

Upon the depression of valve stem 13, sealant is introduced under pressure through hose 22 and ultimately through hose 14 and into a tire under repair by engaging screw valve 28 with the tire's valve stem (not shown). Sealant enters fitting 31 through passageway 34. Pressure contained within disposable self-contained aerosol container 11 dislodges ball 36 and compresses spring 38 that biases the ball against the wall of the valve (as shown in FIG. 3) thus opening passage for sealant through multi-way valve 30 causing sealant to emanate through fitting 33 and ultimately through hose 14 and into a tire being repaired. Valve stem 13 is actuated by depressing release valve 12. This is accomplished by rotating multi-way switch 18. Multi-way switch 18 includes cam surface 51 which, when passing over and in contact with release valve 12, causes the release valve to be depressed downwardly thus acting upon valve stem 13 to selectively release sealant under pressure from disposable self-contained aerosol container 11.

When multi-way switch 18 passes between its off position and that for activating motor 16, it causes an electrical connection between the motor and the 12V DC power source of the vehicle accessed by car accessory adapter 25. Cam surface 57 of multi-way switch selectively completes the suitable electrical connection. Motor 16 turns tooth gear 8 activating compressor 15 resulting in air under pressure to be delivered to fitting 32 passing through passageway 35 which in turn depresses spring 39 through dislodgment of ball 37. This results in pressurized air passing through fitting 33 and hose 14 for inflating a tire under repair. Specifically, compressed air from compressor 15 enters fitting 60, with fitting 62 connected to compressed air hose 23 and secondary fitting 61 being connected to hose 4 which, in turn, is terminated by pressure sensor 5.

It is noted that through the operation of multi-way switch 18, release valve 12 cannot be depressed when motor 16 is activated and motor 16 cannot be activated when release valve 12 is depressed. Thus, only sealant or compressed air can pass through tube 14 individually. Furthermore, the activation of motor 16 and thus compressor 15 a not necessary in causing sealant to flow through tube 14 as disposable self-contain aerosol container 11 is self-pressurized. Thus, in the event that the car battery is unable to deliver the necessary 12V DC power to activate motor 16 and thus compressor 15, sealant can be delivered to a tire under repair. Furthermore, whenever disposable self-contained aerosol container 11 is depleted of sealant or is damaged or otherwise incapable of delivering sealant as intended, one can simply replace disposable self-contain aerosol container 11.

Thus, what has been disclosed is a remarkably simple device devoid of finely machined parts and thus more reliable and more inexpensive to produce than similar products currently available. The sealant source and source of compressed air operate independently of one another so that sealant can be applied to a tire under repair regardless of the status of the compressor. Likewise, in the event that sealant is unavailable, compressed air could be applied to a tire under repair as long as a suitable power source is available.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

The invention claimed is:

1. A tire repair and inflation device comprising a housing, a cavity for receiving and removably retaining a disposable self-contained aerosol container as a source of sealant, a disposable self-contained aerosol container containing sealant under pressure and a release valve, a compressor and a multi-way valve, said multi-way valve comprising a first inlet for receiving sealant from said disposable self-contained aerosol container upon actuation of said release valve and a second inlet for receiving air under pressure from said compressor and an outlet for selectively discharging sealant and compressed air to a tire under pressure, wherein said sealant being delivered to said multi-way valve and said compressed air being delivered to said multi-way valve act independently of one another.

2. The tire repair and inflation device of claim 1 further comprising a multi-way switch accessible on the exterior of said housing, said multi-way switch selectively causing said sealant to discharge from said disposable self-contained aerosol container in a first position and selectively activating said compressor in a second position.

3. The tire repair and inflation device of claim 2 wherein said multi-way switch prevents said discharge of sealant and activation of said compressor simultaneously.

4. The tire repair and inflation device of claim 2 wherein said release valve comprises a valve stem which when depressed discharges sealant from said disposable self-contained aerosol container to said multi-way valve, said multi-way switch depressing said valve stem when in said first position.

\* \* \* \* \*